United States Patent
Cousins et al.

(10) Patent No.: US 6,351,752 B1
(45) Date of Patent: Feb. 26, 2002

(54) METHOD AND APPARATUS FOR DETECTING CHANGES TO A COLLECTION OF OBJECTS

(75) Inventors: William R. Cousins, Columbia; Franz Badias, Lexington; William S. Means, Columbia, all of SC (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/111,952

(22) Filed: Jul. 8, 1998

(51) Int. Cl.$^7$ ................................................ G06F 17/30
(52) U.S. Cl. ....................... 707/103; 708/100; 708/164; 707/200; 707/10
(58) Field of Search ................................ 707/203, 164, 707/3, 200, 103, 10; 708/100, 164

(56) References Cited

U.S. PATENT DOCUMENTS

| | | | |
|---|---|---|---|
| 4,080,589 A | * 3/1978 | Kline ........................... | 714/704 |
| 4,241,445 A | * 12/1980 | Payen .......................... | 714/704 |
| 4,339,657 A | * 7/1982 | Larson et al. ............... | 714/704 |
| 4,558,413 A | 12/1985 | Schmidt et al. ............. | 364/300 |
| 5,133,075 A | 7/1992 | Risch .......................... | 395/800 |
| 5,223,827 A | * 6/1993 | Bell et al. ............... | 340/825.06 |
| 5,381,425 A | * 1/1995 | Bitzer et al. ................... | 371/43 |
| 5,471,629 A | 11/1995 | Risch .......................... | 395/800 |
| 5,493,682 A | 2/1996 | Tyra et al. ................... | 395/700 |
| 5,659,735 A | 8/1997 | Parrish et al. .............. | 395/610 |
| 5,664,189 A | 9/1997 | Wilcox et al. .............. | 395/621 |
| 5,880,746 A | * 3/1999 | Loginov ...................... | 345/524 |
| 5,987,611 A | * 11/1999 | Freund ........................ | 713/201 |
| 6,004,276 A | * 12/1999 | Wright et al. ............... | 600/508 |
| 6,026,440 A | * 2/2000 | Shrader et al. ............. | 709/224 |

\* cited by examiner

Primary Examiner—Jean M. Corrielus
(74) Attorney, Agent, or Firm—Maginot, Additon & Moore

(57) ABSTRACT

A method of detecting a change to a collection of objects is disclosed. One step of the method includes generating a first collection value that is based upon object values associated with the objects of the collection. Another step of the method includes storing the first collection value. The method also includes the step of generating a second collection value that is based upon the object values after the storing step. Moreover, the method includes the step of determining whether the collection has changed based upon the second collection value and the stored first collection value. A computer readable medium which configures a processor to detect a change to a collection of objects is also disclosed.

15 Claims, 4 Drawing Sheets

FIG. 3

| MESSAGE IDENTIFIER | MESSAGE STRING |
|---|---|
| 0000 | "FILE" |
| 0001 | "EDIT" |
| 0002 | "VIEW" |
| ⋮ | ⋮ |
| 07FE | "PRINT ERROR ENCOUNTERED" |
| 07FF | "DISK ERROR ENCOUNTERED" |
| 0800 | "MEMORY ERROR ENCOUNTERED" |
| ⋮ | ⋮ |
| 2FEA | "COPYRIGHT 1998" |

FIG. 4

```
CalculateCombinedTimeStamp(Collection)
    CombinedTimeStamp = 0
    For Each Object In Collection
        CombinedTimeStamp = CombinedTimeStamp XOR
            Object.TimeStamp
    End For
    Return CombinedTimeStamp
```

FIG. 6

```
For Each Collection
    If CalculateCombinedTimeStamp(CurrentCollection) <>
            CurrentCollection.StoredTimeStamp Then
        Process Changes
        CurrentCollection.StoredTimeStamp =
            CalculateCombinedTimeStamp(CurrentCollection)
    End If
End For
```

METHOD AND APPARATUS FOR DETECTING CHANGES TO A COLLECTION OF OBJECTS

BACKGROUND OF THE INVENTION

The present invention relates generally to detecting changes to objects such as files of a computer system, and more particularly to a method and apparatus that detects changes to a collection of objects based upon a collection value for the collection of objects.

Computer systems commonly need to perform actions in response to changes to an object. Accordingly, computer systems need to determine whether changes to an object have occurred so that the computer system may take the appropriate actions. Prior art systems have typically determined whether an object has changed by determining whether a value associated with the object has changed. For example, computer systems typical include file systems that store files with an associated timestamp. Depending upon the file system, the timestamp may have different meanings (e.g. creation date, save date, modified date). While the timestamp may have different meanings under different file systems, the timestamp for a file will typically change when the file changes. Due to this relationship between the file and associated timestamp, prior art computer systems have typically tracked timestamps in order to determine whether the associated files have changed.

For example, in order to detect whether a file has changed, a prior art computer system stored a copy of the timestamp for the file and periodically compared the stored copy of the timestamp to the current timestamp for the file. While comparing timestamps (each typically containing a few bytes) consumes less storage and is simpler than directly comparing files (each possibly containing several megabytes), the above approach still consumes a large amount of storage when the computer system needs to detect changes to a large number of objects.

Therefore, what is needed is a method and apparatus that detect changes to objects in a manner that consumes less storage than storing an associated value such as a timestamp for each object.

SUMMARY OF THE INVENTION

In accordance with one embodiment of the present invention, there is provided a method of detecting a change to a collection of objects. One step of the method includes generating a first collection value that is based upon object values associated with the objects of the collection. Another step of the method includes storing the first collection value. The method also includes the step of generating a second collection value that is based upon the object values after the storing step. Moreover, the method includes the step of determining whether the collection has changed based upon the second collection value and the stored first collection value.

Pursuant to another embodiment of the present invention, there is provided a method of updating a first collection of first objects which are a copy of a second collection of second objects. One step of the method includes generating a first collection value that is based upon first object values associated with the first objects of the first collection. Another step of the method includes generating a second collection value that is based upon second object values associated with the second objects of the second collection. The method also includes the step of determining whether the first collection is different than the second collection based upon the first collection value and the second collection value. Moreover, the method includes the step of updating the first collection in response to the determining step determining that the first collection is different than the second collection.

Pursuant to yet another embodiment of the present invention, there is provided a computer readable medium that configures a processor to detect a change in a collection of objects. The computer readable medium includes a plurality of instructions. The plurality of instructions when executed by the processor cause the processor to generate a first collection value that is based upon object values associated with the objects of the collection. The plurality of instructions when executed by the processor also cause the processor to (i) store the first collection value, and (ii) generate after storing the first collection value a second collection value that is based upon the object values. Moreover, the plurality of instructions when executed by the processor cause the processor to determine whether the collection has changed based upon the second collection value and the stored first collection value.

It is an object of the present invention to provide a new and useful method and apparatus for detecting changes to objects.

It is another object of the present invention to provide an improved method and apparatus for detecting changes to objects.

It is an additional object of the present invention to provide a method and apparatus that detect changes to objects in a manner that consumes less storage than storing an associated value such as a timestamp for each object.

The above and other objects, features, and advantages of the present invention will become apparent from the following description and the attached drawings.

BRIEF DESCRIPTION OF THE DRAWINGS

FIG. 3 shows a diagram of a message file that is associated with an event source of FIG. 2;

FIG. 4 shows a pseudo-code representation of a software routine that configures a processor to calculate a collection value for a collection of objects;

FIG. 6 shows a pseudo-code representation of a software section that configures a processor to detect a change in a collection of objects.

DETAILED DESCRIPTION OF A PREFERRED EMBODIMENT

Figure 1:
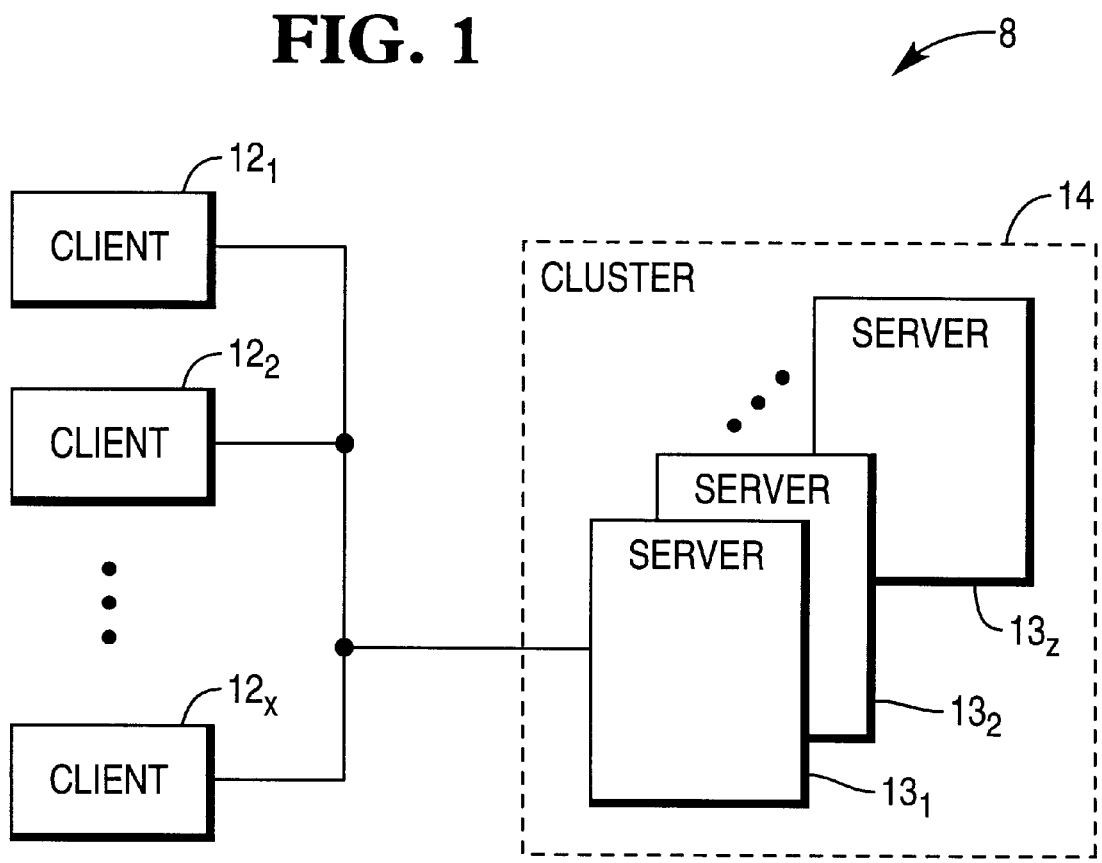
FIG. 1 shows a simplified block diagram of a computer network upon which a management system that incorporates features of the present invention may be implemented.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

FIG. 1 illustrates a computer network 8 upon which a management system 10 which incorporates features of the present invention may be implemented. The computer network 8 in a preferred embodiment includes client computers $12_1 \ldots 12_X$ which are connected to a Microsoft Windows NT server $13_Y$ or a cluster 14 of Microsoft Windows NT servers $13_1 \ldots 13_Z$ that execute various software routines.

Figure 2:
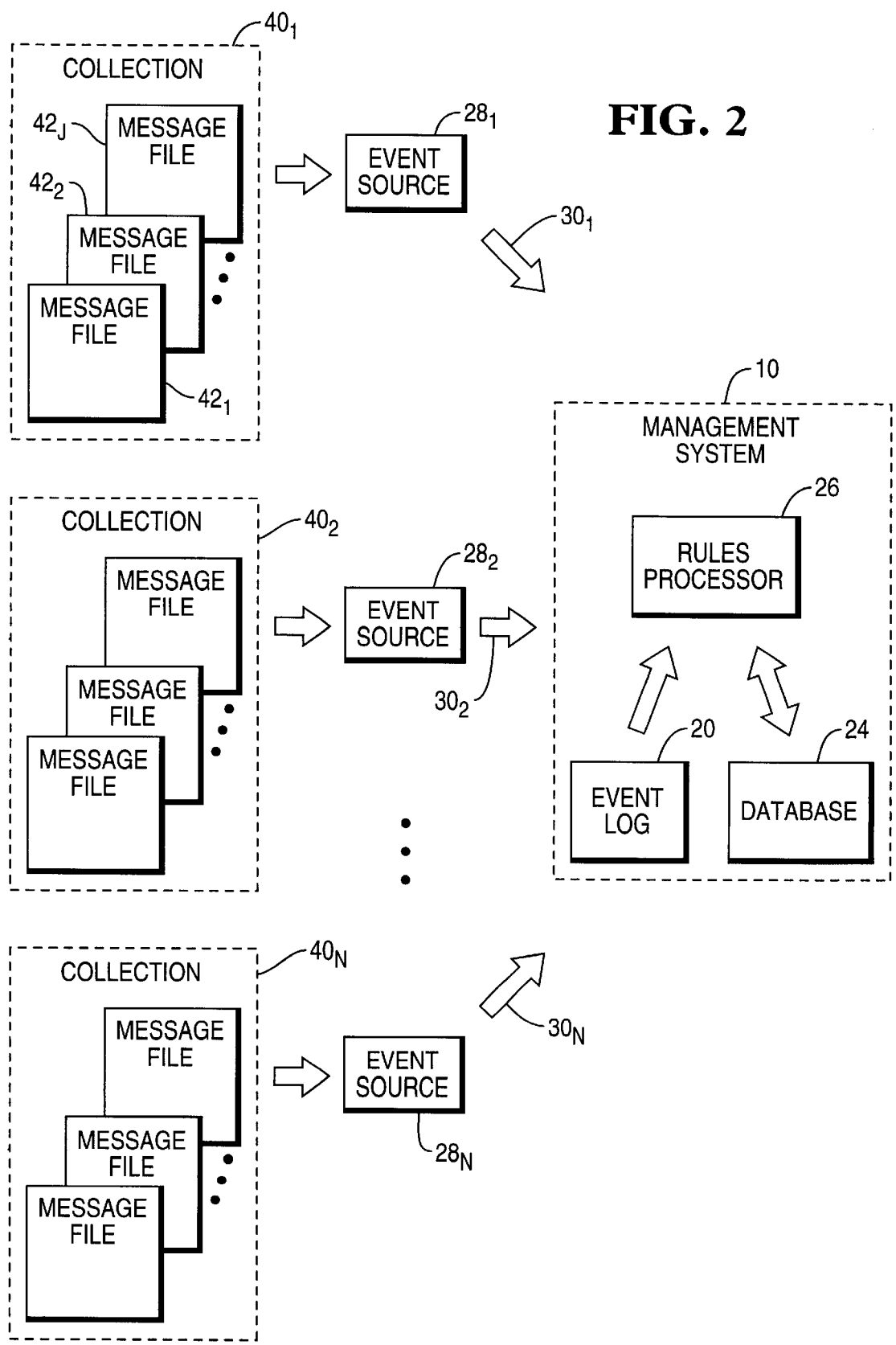
FIG. 2 shows a simplified diagram of the management system of FIG. 1.

A simplified functional diagram of the management system 10 to be implemented upon the computer network 8 is illustrated in FIG. 2. The various functional components illustrated in FIG. 2 may be (i) implemented upon a single server $13_Y$, (ii) distributed across the servers $13_1 \ldots 13_Z$ of the cluster 14, or (iii) distributed across the client computers $12_1 \ldots 12_X$ and the servers $13_1 \ldots 13_Z$ of the cluster 14. Moreover, while the invention is disclosed in a Microsoft Windows NT server environment, features of the present invention may be implemented in other environments.

As illustrated in FIG. 2, the management system 10 includes an event log 20, a database 24, and a rules processor 26. Event sources $28_1 \ldots 28_N$ are operable to generate event messages $30_1 \ldots 30_N$ which may be received by the management system 10 and stored in the event log 20. The event sources $28_1 \ldots 28_N$ are generally software applications which have been registered with the management system 10. Each event sources $28_M$ includes an associated collection $40_M$ of message files $42_1 \ldots 42_J$. Moreover, each event source $28_M$ generates an event message $30_M$ after the event source $28_M$ (i) performs various functions, and/or (ii) encounters various conditions. For example, an event source $28_M$ may generate an event message $30_M$ in response to the event source $28_M$ encountering a disk error.

As shown in FIG. 3, a message file $42_K$ includes several message identifiers 44 and associated message strings 46. By indexing the message file $42_K$ with a message identifier 44, an event source $28_M$ or another application such as the management system 10 may obtain a message string 46 that describes the event causing the event source $28_M$ to generate the message identifier 44. For example, in response to an event source $28_M$ encountering a disk error, the event source $28_M$ may generate an event message $30_M$ having a message identifier 44 equal to 07FFx0 (i.e. 1047 in hexadecimal). The event source $28_M$ then may obtain the message string "Disk Error Encountered" from its associated collection $40_M$ of message files by indexing the appropriate message file of the collection $40_M$ with the message identifier 44.

The use of message files simplifies the development of event sources such as software applications intended for international release. A collection of message files for each language (i.e. English, French, Spanish, etc.) may be developed with equivalent message strings 46 that are associated with the same message identifier 44. Assuming the application obtains text strings to display by indexing an associated collection of message files with a message identifier, the application may be distributed in different languages by simply supplying the application with the appropriate collection of message files.

Referring back to FIG. 2, the database 24 of the management system 10 stores information used by the management system 10. The database 24 in the preferred embodiment is implemented as a Microsoft SQL (structured query language) database in which are stored various records of data in a conventional manner. While the database 24 in the preferred embodiment is implemented as a Microsoft SQL database, the management system 10 may be implemented (i) with a database that is implemented using a different database structure, or (ii) with another storage structure that replaces the database 24. The advantage of implementing the management system 10 with an SQL database is that the SQL database provides the management system 10 with a mechanism for storing and retrieving data in a non-volatile manner which has a reliable and consistent interface stemming from being a standard off-the-shelf component.

The rules processor 26 of the management system 10 is operable to (i) process user defined rules, and (ii) trigger actions in response to determining that a user defined rule has been satisfied. A rule is a set of user established conditions that must exist before the rules processor 26 triggers an associated action. At the user's direction, a rule can establish a specific event that must occur before an associated action is executed. For example, a rule may establish (i) where a specific event (i.e. the user's name or computer name), (ii) the day or time of day the event must occur, or (iii) the number of times the event must occur before the event triggers an action. Once all of the conditions of a rule are satisfied, the rules processor 26 of the management system 10 triggers an action that is associated with the rule.

An action may include notifying, logging, or running a application. For example, execution of an action may cause the management system 10 to (i) send a page, (ii) send an e-mail, (iii) log an event to the printer, or (iv) run a diagnostic application. Moreover, an action may include several actions to be executed when the associated rule is satisfied. In other words, the rules processor 26 may cause several actions to occur such as notifying various applications, logging various information, and running various applications all in response to conditions of a single rule being satisfied.

The management system 10 allows a user to define a rule based upon the message strings 46 of the collections $40_1 \ldots 40_N$. Since the event log 20 of the management system 10 receives the message identifiers 44 generated by the event sources $28_1 \ldots 28_N$, the management system 10 could be implemented to allow users to define rules based upon message identifiers 44. However, since the message identifiers 44 are merely numeric values, users of the management system 10 are unlikely to easily associate the generated message identifiers 44 with the corresponding event which caused the event sources $28_1 \ldots 28_N$ to generate the message identifiers 44. Accordingly, (i) the rules processor 26 of the management system 10 is operable to allow users to define rules based upon the message strings 46, and (ii) the management system 10 maintains in the database 24 a copy of the collections $40_1 \ldots 40_N$.

Maintaining a separate copy of the the collections $40_1 \ldots 40_N$ enables the rules processor 26 to more quickly associate the message identifiers 44 with their corresponding message strings 46. However, by maintaining a separate copy of the collections $40_1 \ldots 40_N$, the management system 10 must also ensure that the separate copy of the collections $40_1 \ldots 40_N$ are up to date. In other words, if (i) a message file $42_K$ of a collection $40_M$ is changed, (ii) a message file $42_K$ is added to a collection $40_M$, or (iii) a message file $42_K$ is removed from a collection $40_M$, then the management system 10 needs to update the copy of the collection $40_M$ stored in the database 24 in order to ensure that the rules processor 26 correctly processes the user defined rules that have been generated based upon message strings 46 of the collection $40_M$.

The management system 10 in the preferred embodiment generates and stores in the database 24 a single collection value for each collection $40_1 \ldots 40_N$. The collection value is based upon object values associated with the objects contained in each collection $40_1 \ldots 40_N$. In particular, the collection value may be based upon object values such as timestamps, checksums, cyclical redundancy check (CRC) values, byte lengths, and version stamps which change in response to the associated object changing. Moreover, the collection value for a collection $40_M$ is generated based upon the object values of the collection $40_M$ in such a manner that the collection value changes whenever (i) an object of the collection $40_M$ changes, (ii) an object is added to the collection $40_M$, or (iii) an object is removed from the collection $40_M$.

FIG. 4 shows a software function CalculateCombinedTimeStamp( ) that, when executed by a processor of the management system 10, causes the management system 10 to generate a collection value for a collection of objects. The software function CalculateCombinedTimeStamp( ) is represented with pseudo-code that is loosely based upon the C software language. In particular, the management system 10 upon executing the software function CalculateCombinedTimeStamp( ) generates a collection value which may be viewed as a combined timestamp value for the collection of objects since the software function CalculateCombinedTimeStamp( ) causes the management system 10 to calculate the collection value based upon timestamp values associated with the objects of the collection.

To this end, a software process of the management system 10 calls the software function CalculateCombinedTimeStamp( ) with the argument Collection which may be implemented as a pointer to a collection structure containing objects and associated timestamp values. In response to calling the software function CalculateCombinedTimeStamp( ), the software function CalculateCombinedTimeStamp( ) causes the management system 10 to set the combined timestamp value CombinedTimeStamp equal to a constant such as 0. Moreover, the software function CalculateCombinedTimeStamp( ) causes the management system 10 to update the combined timestamp value CombinedTimeStamp by setting the combined timestamp value CombinedTimeStamp equal to the a bitwise exclusive-or of the combined timestamp value CombinedTimeStamp and a timestamp value Object.TimeStamp associated with an object Object of the collection structure to which the argument Collection points.

The software function CalculateCombinedTimeStamp( ) causes the management system 10 to repeat the above bitwise exclusive-or operation of the combined timestamp value CombinedTimeStamp with the timestamp Object TimeStamp for each remaining object Object of the collection structure pointed to by the argument Collection. After performing the exclusive-or operation upon each timestamp Object.TimeStamp contained in the collection structure, the software function CalculateCombinedTimeStamp( ) causes the combined timestamp value CombinedTimeStamp to be returned to the process of the management system 10 which called the function CalculateCombinedTimeStamp( ).

Figure 5:
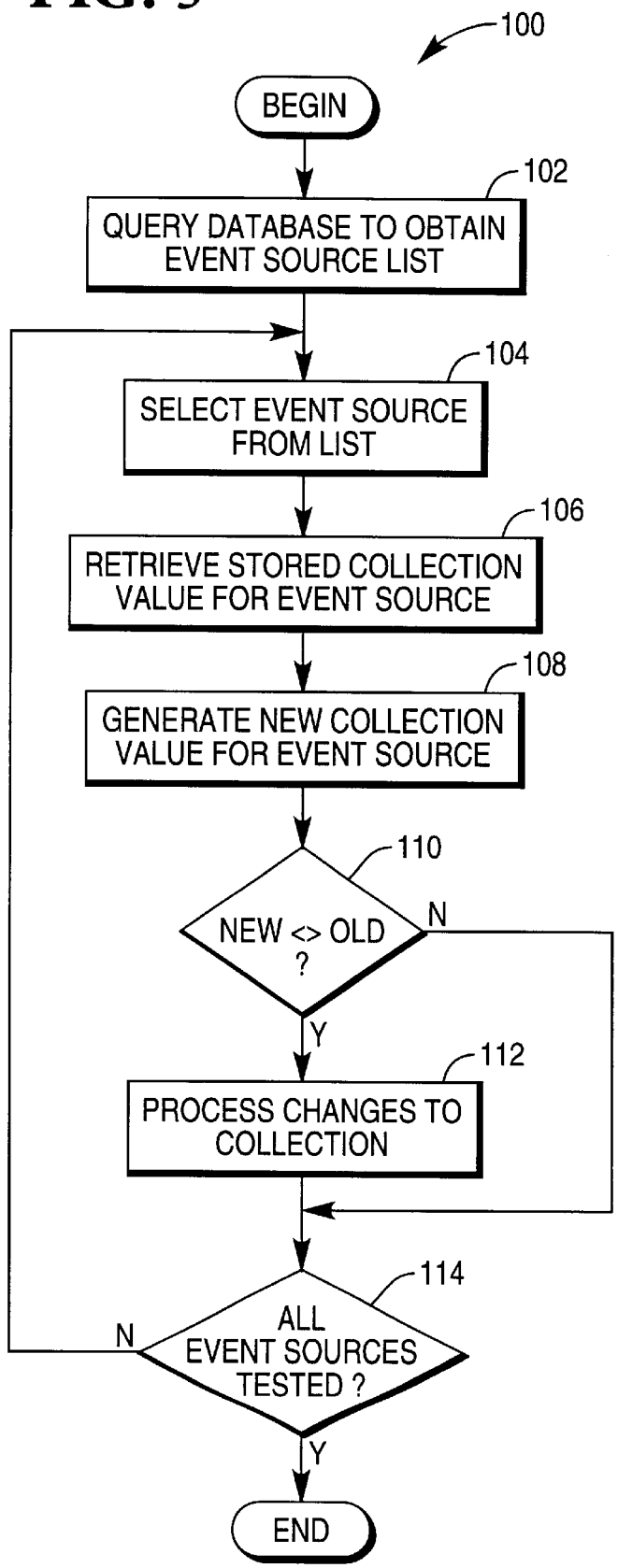
FIG. 5 shows a flowchart of a detection method used by the management system of FIG. 2.

Shown in FIG. 5 is a detection method 100 used by the management system 10 to detect and process changes to collections $40_1 \ldots 40_N$ of message files. In particular, the management system 10 in the preferred embodiment executes the detection method 100 upon (i) startup of the management system 10, and/or (ii) a restart/update request received from a user or another application. The management system 10 in step 102 queries the database 24 to obtain an event source list of event sources $28_1 \ldots 28_N$ that have registered the collections $40_1 \ldots 40_N$ with the management system 10.

Then, the management system 10 in step 104 selects an event source $28_M$ from the event source list. After selecting an event source $28_M$, the management system 10 in step 106 retrieves a record from the database 24 which includes a stored collection value for the collection $40_M$ of message files associated with the selected event source $28_M$. Then, the management system 10 in step 108 generates a new collection value for the collection $40_M$ associated with the selected event source $28_M$. To this end, the management system 10 (i) generates for the selected event source $28_M$ a collection structure which includes objects that each have an associated timestamp, and (ii) calls the software function CalculateCombinedTimeStamp( ) of FIG. 4 such that the argument Collection points to the collection structure containing the objects and associated timestamps. In response to calling the software function CalculateCombinedTimeStamp( ), the management system 10 receives a newly generated collection value for the collection $40_M$ associated with the selected event source $28_M$.

The management system 10 in step 110 compares the newly generated collection value with the stored collection value. If the newly generated collection value is not equal to the stored collection value for the selected event source $28_M$, then the collection $40_M$ must have changed some time after the management system 10 stored the collection value in the database 24. In other words, since the last time the management system 10 stored a collection value for the collection $40_M$ at least one message file $42_K$ of the collection $40_M$ must have been (i) altered, (ii) removed from the collection $40_M$, or (iii) added to the collection $40_M$.

Accordingly, the management system 10 in step 112 processes the changes to the collection $40_M$. For example, the management system 10 may replace the stored collection $40_M$ of message files $42_1 \ldots 42_J$ and associated collection value with the updated collection of message files $42_1 \ldots 42_J$ and newly generated collection value. Moreover, the management system 10 may update or disable user defined rules that are affected by the changes to the collection $40_M$ of message files. Furthermore, the management system 10 may generate a notification which notifies a system administrator that certain rules may no longer be valid due to changes to the collection $40_M$.

The management system 10 in step 114 determines whether all registered event sources $28_1 \ldots 28_N$ have been tested for changes to their respected collections $40_1 \ldots 40_N$ of message files. If all the event sources $28_1 \ldots 28_N$ have not been tested, then the management system 10 returns to step 104 in order to (i) select another event source $28_{M+1}$ from the event source list, and (ii) determine whether the collection $40_{M+1}$ associated with the selected event source $28_{M+1}$ has changed.

A software section 80 that, when executed by a processor of the management system 10, causes the management system 10 to determine whether a collection of objects has changed is shown in FIG. 6. The software section 80 is represented with pseudo-code that is loosely based upon the C software language. In particular, the software section 80 when executed by the management system 10 causes the management system 10 to (i) generate a current collection value for a collection of objects, and (ii) compare the newly generated current collection value with a stored collection value for the collection of objects. Moreover, the software section 90 causes the management system 10 to process changes to the collection of objects if the collection has changed. The current collection value and the stored collection value may be viewed as combined timestamp values for the collection of objects since the management system 10 calculates the current collection value and the stored collection value based upon timestamp values associated with the objects of the collection.

For each collection being monitored for changes, the software section 80 causes the management system 10 to calculate a current collection timestamp CurrentCollectionTimeStamp by calling the software function CalculateCombinedTimeStamp( ) and causing the single argument Collection of the software function CalculateCombinedTimeStamp( ) to point to a collection structure that is also pointed to by the pointer CurrentCollection. The collection structure pointed to by the pointer CurrentCollection contains objects that each have an associated timestamp value.

After calculating a new collection value, the software section 80 causes the management system 10 to compare the newly generated collection value to a stored timestamp value CurrentCollection.StoredTimeStamp for the collection structure pointed to by the pointer CurrentCollection. If the newly generated collection value is not equal to the stored timestamp value CurrentCollection.StoredTimeStamp, then at least one object of the collection structure pointed to by the pointer CurrentCollection has changed. Accordingly, the software routine 80 causes the management system 10 to (i) process the changes to the current collection, and (ii) set the stored timestamp value CurrentCollection.StoredTimeStamp for the collection structure pointed to by the pointer CurrentCollection.

While the invention has been illustrated and described in detail in the drawings and foregoing description, such illustration and description is to be considered as exemplary and not restrictive in character, it being understood that only a preferred embodiment has been shown and described and that all changes and modifications that come within the spirit of the invention are desired to be protected. For example, while the present invention has been described as generating a collection value by performing a bitwise exclusive-or operation other operations could be used to generate the collection values

What is claimed is:

1. A method of detecting a change in an assemblage of objects, comprising the steps of:

generating a first value for an assemblage of objects, said first value based upon object values associated with said objects of said assemblage, said first value generating step including the step of combining said object values into said first value by performing a bit-wise exclusive-or operation upon said object values;

storing said first value;

generating a second value for said assemblage of objects, said second value based upon said object values after said storing step, said second value generating step including the step of combining said object values into said second value by performing said bit-wise exclusive-or operation upon said object values; and determining whether said assemblage of objects has changed based upon said second value and said stored first value.

2. The method of claim 1, wherein said determining step includes the step of signaling that said assemblage of objects has changed when said second value is different that said stored first value.

3. The method of claim 1, wherein:

said storing step includes the steps of (i) generating a database record which includes said first value, and (ii) storing said database record in a database; and said determining step includes the steps of (i) retrieving said database record from said database, and (ii) extracting said first value from said database record.

4. The method of claim 1, wherein:

said object values are timestamps that are associated with said objects of said assemblage of objects.

5. The method of claim 4, wherein said determining step includes the step of signaling that said assemblage of objects has changed when said second value is different than said stored first value.

6. The method of claim 1, further comprising the step of:

adding a first object having a first object value to said assemblage of objects after said step of generating said first value; and wherein said second value generating step includes the step of calculating said second value based upon said object values associated with said objects of said assemblage including said first object value after said adding step.

7. The method of claim 1, further comprising the step of:

removing a first object value from said assemblage of objects after said step of generating said first value; and wherein said second value generating step includes the step of calculating said second value based upon said object values associated with said objects of said assemblage excluding said first object value after said removing step.

8. A method of updating a first assemblage of first objects which are a copy of a second assemblage of second objects, comprising the steps of:

generating a first assemblage value that is based upon first object values associated with first objects of a first assemblage, said first assemblage value generating step including the step of combining said first object values into said first assemblage value by performing a bitwise exclusive-or operation upon said first object values;

generating a second assemblage value that is based upon second object values associated with second objects of a second assemblage, said second assemblage value generating step includes the step of combining said second object values into said second assemblage value by performing said bit-wise exclusive-or operation upon said second object values;

determining whether said first assemblage of first objects is different than said second assemblage of second objects based upon said first assemblage value and said second assemblage value; and updating said first assemblage of first objects in response to said determining step determining that said first assemblage of first objects is different than said second assemblage of second objects.

9. The method of claim 8, wherein:

said determining step includes the step of signaling that said first assemblage of first objects is different than said second assemblage of second objects when said second assemblage value is different than said first assemblage value; and said updating step includes the step of updating said first assemblage of first objects in response to said signaling step.

10. The method of claim 8, further comprising the steps of:

(i) generating a database record which includes said first assemblage value; and (ii) storing said database record in a database; and wherein said determining step includes the steps of (i) retrieving said database record from said database, and (ii) extracting said first assemblage value from said database record.

11. The method of claim 8, wherein:

said first object values are first timestamps that are associated with said first objects of said first assemblage;

said second object values are second timestamps that are associated with said second objects of said second assemblage.

12. The method of claim 11, wherein:

said determining step includes the step of signaling that said first assemblage is different than said second assemblage when said second assemblage value is different than said first assemblage value; and said updating step includes the step of updating said first assemblage in response to said signaling step.

13. A computer readable medium that configures a processor to detect a change in an assemblage of objects, comprising:

a plurality of instructions which when executed by said processor cause said processor to (i) generate a first assemblage value by performing a bit-wise exclusive-or operation upon object values associated with said objects of said assemblage, (ii) store said first assemblage value, (iii) generate after storing said first assemblage value a second assemblage value by performing a bit-wise exclusive-or operation upon said object values, and (iv) determine whether said assemblage of objects has changed based upon said second assemblage value and said stored first assemblage value.

14. The computer readable medium of claim 13, wherein said plurality of instructions which when executed by said processor further cause said processor to determine that said assemblage of objects has changed when said second assemblage value is different than said stored first assemblage value.

15. The computer readable medium of claim 13, wherein:

said object values are timestamps that are associated with said objects of said assemblage.

\* \* \* \* \*